United States Patent [19]

Englert et al.

[11] Patent Number: 5,605,417
[45] Date of Patent: Feb. 25, 1997

[54] METHOD AND APPARATUS FOR IMPROVING DEGRADATION OF AN UNSECURED LANDFILL

[75] Inventors: Christopher J. Englert, Novi; James Dragun, Farmington Hills, both of Mich.

[73] Assignee: The Dragun Corporation, Farmington Hills, Mich.

[21] Appl. No.: 277,421

[22] Filed: Jul. 18, 1994

[51] Int. Cl.$^6$ ........................................... B09B 3/00
[52] U.S. Cl. ........................... 405/129; 405/128; 588/259; 588/260
[58] Field of Search ................................. 405/128, 129; 588/249, 259, 260

[56] References Cited

U.S. PATENT DOCUMENTS

| | | |
|---|---|---|
| 1,286,017 | 11/1918 | Jones . |
| 2,572,767 | 10/1951 | Schlenz . |
| 3,586,624 | 6/1971 | Larson . |
| 3,705,851 | 11/1971 | Brauer . |
| 3,732,697 | 5/1973 | Dickson . |
| 3,846,292 | 11/1974 | Lecompte, Jr. . |
| 4,323,367 | 6/1982 | Ghosh . |
| 4,396,402 | 8/1983 | Ghosh . |
| 4,401,569 | 8/1983 | Jhaveri et al. . |
| 4,430,021 | 2/1984 | Wagner et al. . |
| 4,511,657 | 4/1985 | Colaruotolo et al. . |
| 4,526,615 | 7/1985 | Johnson . |
| 4,696,599 | 9/1987 | Rakoczynski et al. . |
| 4,713,340 | 12/1987 | Crawford . |
| 4,755,296 | 7/1988 | Ying et al. . |
| 4,810,131 | 3/1989 | Turner . |
| 5,000,618 | 3/1991 | Greenley . |
| 5,055,193 | 10/1991 | Hooper . |
| 5,092,709 | 3/1992 | Davis . |
| 5,120,160 | 6/1992 | Schwengel . |
| 5,139,365 | 8/1992 | Chesner . |
| 5,201,609 | 4/1993 | Johnson . |
| 5,238,580 | 8/1993 | Singhvi . |
| 5,249,888 | 10/1993 | Braithwaite et al. ................. 405/128 |
| 5,252,226 | 10/1993 | Justice ................................. 405/128 X |
| 5,263,795 | 11/1993 | Corey et al. ......................... 405/128 |
| 5,286,140 | 2/1994 | Mather ................................. 405/128 |
| 5,295,763 | 3/1994 | Stenborg et al. ................... 405/128 X |
| 5,348,422 | 9/1994 | Manchak et al. ................... 405/128 |
| 5,387,056 | 2/1995 | DeLuca ................................ 405/128 |

OTHER PUBLICATIONS

J. Morelli, Leachate Recirculation: Design and Operation Considerations, May–Jun. 1992, MSW Management, pp. 27–36.

R. Saint–Fort, Fate of Municipal Refuse Deposited in Sanitary Landfills & Leachate Treatability, 1992, J. Environ. Sci. Health, A27(2), pp. 369–401.

D. W. Harrington et al., The Treatment of Leachate: A UK Perspective, Water Pollution Control, 1986, vol. 85, pp. 45–56.

(List continued on next page.)

*Primary Examiner*—Dennis L. Taylor
*Attorney, Agent, or Firm*—Reising, Ethington, Barnard & Perry

[57] ABSTRACT

A process for improving degradation, stabilization, detoxification and volume reduction of refuse within an unsecured landfill. The process comprises the control of ground water and extracting the ground water for use as a liquid medium to facilitate creation and recirculation of leachate. The present process requires that landfill leachate be collected and recycled back into the landfill. The process additionally includes the injection of selected wastes and additives into the leachate, leachate enroute to be recirculated through the landfill. The materials which can be added to the leachate alter the mix of physical and chemical conditions within the landfill so as to accelerate the rate of leachate stabilization, accelerate the rate of conversion and stabilization of organic and inorganic refuse within the landfill, reduce the volume of landfill refuse, and reduce the potential toxicity of refuse. The landfill thus becomes an anaerobic biological reactor with physical-chemical treatment capabilities.

26 Claims, 2 Drawing Sheets

OTHER PUBLICATIONS

J. Morelli, Landfill Reuse Strategies, BioCycle, Apr. 1990, pp. 60–61.

J. Morelli, Landfill Reuse Strategies, BioCycle, Mar. 1990, pp. 40–43, 62.

D. J. L. Forgie, Selection of the Most Appropriate Leachate Treatment Methods,.Water Poll. Res. J. Canada, vol. 23, No. 2, 1988, pp. 329–340.

J. J. Lee et al., Computer and Experimental Simulations of the Production of Methane Gas from Municipal Solid Waste, Wat. Sci. Tech. vol. 27, No. 2, 1993, pp. 225–234.

J. Mata–Alvarez, A Dynamic Simulation of a Two–Phase Anaerobic Digestion System for Solid Wastes, Biotechnology & Bioengineering, vol. 30, 1987, pp. 844–851.

B. R. Natale et al., Evaluation of Landfill Leachate Recirculation, Environmental Engineering, 1986, pp. 134–139.

P. J. Maris et al., Treatment of Landfill Leachate: Management Options, Water Poll. Res. J. Canada, vol. 20, No. 3, 1985, pp. 29–42.

M. E. Tittlebaum, Organic Carbon Content Stabilization through Landfill Leachate Recirculation, Journal WPCF, vol. 54, No. 5, pp. 428–433.

F. G. Pohland et al., Leachate Generation and Control at Landfill Disposal Sites, Water, Poll. Res. J. Canada: vol. 20, No. 3, 1986, pp. 10–24.

F. G. Pohland, et al., Pilot–Scale Investigations of Accelerated Landfill Stabilization with Leachate Recycle, Aug., 1979, pp. 283–295.

F. G. Pohland et al., Sanitary Landfill Stabilization with Leachate Recycle and Residual Treatment, CICHE Symposium Series, No. 145, vol. 71, 175, pp. 308–318.

A. B. Al–Yousfi et al., Design of Landfill Leachate Recirculation Systems Based on Flow Characteristics, Proceed. 47th Industrial Waste Conf., May, 1992, pp. 491–500.

D. Radnoff, Leachate Treatment for Small Rural Communities, Water & Pollution Control, Oct., 1991, pp. 14–16.

B. W. Baetz et al., Storage Volume Sizing for Landfill Leachate–Recirculation Systems, pp. 378–383.

P. A. de Boks, Re–Infiltration of Waste Tip Leachate: An Inexpensive Alternative, Environmental Technology, Jun., 1987, pp. 587–592.

R. Stegmann et al., Research Activities on Enhancement of Biochemical Processes in Sanitary Landfills, Water Poll. Res. J. Canada, vol. 21, No. 4, 1986, pp. 572–591.

N. C.Vasuki, Why Not Recycle the Landfill!, Waste Age, Nov. 1988, pp. 165–170.

N. C. Vasuki, Modern Landfill Technologies, Proceedings of the 18th Annual Illinois Energy Conf., pp. 111–126.

METHOD AND APPARATUS FOR IMPROVING DEGRADATION OF AN UNSECURED LANDFILL

TECHNICAL FIELD

This invention relates to improved degradation of refuse within an unsecured landfill.

BACKGROUND OF THE INVENTION

The search for environmentally responsible disposal techniques of waste products is an issue that has been a problem in the past, and will continue to be a significant problem for the future. The United States Environmental Protection Agency in its February 1989 "Agenda For Action" estimated the annual generation of municipal solid waste will increase from 160 million tons (1988) to 193 million tons by the year 2000. While the quantity of refuse generated increases, capacity for waste containment decreases. The problem is heightened in regions of high population density, such as major metropolitan centers, where the landfill sites being used for disposal of municipal solid waste are at or near maximum capacity, and the mere suggestion of building a new landfill site incenses neighboring communities. Moreover, the continued use of even existing landfill sites raise a myriad of issues. For example, landfill sites are often unsuitable for development for many years, in part due to the natural subsidence of the refuse within the landfill. Landfill sites are also potential sources of both water and air pollution, which thus mandates segregation of the landfill from populated environs. Yet, landfill capacity is vital-in that currently over 90% of the refuse generated is housed within the landfill system. Therein lies the problem.

One solution involves increasing the rate of degradation within the currently existing landfill sites such that these landfills can either be reused or transformed into productive land. The use of currently existing landfill sites does, however, necessitate finding a method to secure these landfills so that their mere presence no longer constitutes an environmental menace.

Presently, the rate of landfill degradation is at the mercy of mother nature. Depending on a multitude of variables, such as temperature, pH and moisture content, the rate of degradation within the landfill could vary significantly. What is required to achieve degradation is a balance of many variables, together with sufficient moisture and nutrient content. In a municipal landfill, such requirements are rarely met. As a result, landfills generally undergo stabilization at a very slow rate and at certain periods the mix of variables results in zero degradation.

During the stabilization process a municipal solid waste landfill will go through several identifiable phases.

The first phase is named the initial adjustment period and occurs during waste placement and moisture accumulation.

The second phase (transition) is identified when leachate is generated and the landfill converts from aerobic into anaerobic microbial activity. At this time volatile organic acids appear in the leachate in increasing concentrations.

During the third (acid formation) phase, intermediary volatile organic acids are dominant and pH decreases. Nitrogen and phosphorus support the microbial biomass and hydrogen gas may be detected. The low pH may increase metal mobilization.

The fourth phase (methane fermentation) occurs as the intermediary volatile acids are converted into methane and carbon dioxide. The organic strength of the leachate is reduced as gas production increases. The pH returns to a neutral level and complexation and precipitation of metal occurs.

In the final phase, or maturation, nutrients may become limiting as microbial stabilization of organic constituents is completed. The landfill is more stable, and humic-like (soil-like) substances may be produced. Metals may become mobilized if they complex with constituents in the humic-like substance. Unfortunately, decades and sometimes generations are required for this natural stabilization process to completely decompose the waste. All the while, these landfills are incapable of housing additional waste or becoming otherwise productive land.

This and other concerns become particularly daunting when one examines the specific problems associated with unsecured landfills. Prior to the introduction of modern sanitary landfills, "landfills" constituted a dumping pit with no control measures or implementations for curbing the environmental dangers associated therewith. Presently there are at least 2,000 to 3,000 of these "unsecured landfill" sites within the United States. The term "unsecured landfill" constitutes those landfills which have no protective lining to separate the landfill area from the surrounding environment. In contrast, a secured landfill has protective barriers surrounding the landfilled material. Hence, a secured landfill has a protective bottom liner to act as a barrier from the soil and/or a means for capping the entire landfill from air or other environmental contamination. Devoid of such a protective barrier, an unsecured landfill poses a substantial threat to its surrounding environment.

In particular, the landfill refuse and its by-products may contaminate the surrounding ground water via action of the natural movement of water through the ground. Thus if the refuse within the landfill is not somehow treated or isolated, the refuse can spread beyond the original landfill area through the ground water system, endangering water supplies. In order to avoid these results, there exists a need to treat and "secure" these unsecured landfill sites.

To comprehend different treatment techniques an analysis must be made of the composition of a particular landfill. Landfills generally contain a wide variety of refuse including organic material, some of which undergo anaerobic decomposition. During degradation and further when a liquid such as rain water or ground water comes in contact with the refuse, leachate is formed. During degradation, by a process of liquefaction, a landfill produces leachate. Leachate generally contains high concentrations of various contaminants including ammonia, nitrogen compounds, chemical oxygen demand, volatile organic compounds and possibly heavy metals. As a result, state and federal landfill regulations now contain stringent standards for collecting and treating leachate. The previous focus has therefore been placed on removing leachate from landfills. One such process is shown in U.S. Pat. No. 5,238,580 issued Aug. 24, 1993, A Method For Treating Leachate From a Sanitary Landfill. The method disclosed includes the steps of adding a pH adjuster to elevate the pH of the leachate, such that ammonia nitrogen compounds, COD compounds and volatile organic compounds can be stripped from the leachate; heavy metals form insoluble compounds; combusting landfill gas to produce combustion products and to elevate the temperature of the leachate such that chemical activities enhance therein; precipitating the insoluble compounds from the leachate; and diffusing the combustion gases through the leachate to reduce the pH thereof to any acceptable discharge level. Therefore, in order to prevent problems associated with the existence of leachate, volatile contaminants are removed from the leachate by gas stripping. The landfill gas, subsequent to passage through the gas scrubber, is then directed to a combustion device. A disadvantage of this process is that the process disclosed requires a complex and expensive treatment procedure. Moreover, the process is very slow because the leachate collected and then subsequently treated is limited by the ambient conditions of the landfill. The soil structure and the natural rate of movement of water through the soil can retard creation of leachate and thus tremendously increase the amount of time required to effectively remove the leachate from the landfill. Lastly, gas stripping releases pollutants to the atmosphere and the pollutant is merely being moved from the water we drink to the air we breathe.

In situ remediation of landfills is generally known in the art. One approach to rendering in situ remediation is suggested by U.S. Pat. No. 4,396,402 which teaches a process for improved gas production providing higher gas production rates and yields by accelerated bioleaching of organic wastes. Two phase digestion is used under controlled digester conditions in the process of this invention, that is acid phase digestion is used to promote the growth of the acid forming bacteria and a second methane phase digestion is used to promote the growth of the methane producing organisms. The leachate is thus passed through the digestion phases and then subsequently recycled through the landfill and then back to the digesters. The problem associated with this invention, includes the need for two digesters to promote the formation of both acid forming microorganisms and methane forming microorganisms. Second, the disclosed remediation technology offers no solution for the particular problems associated with unsecured landfills, specifically the need for groundwater control.

Each of the above-mentioned patents suffer from a failure to provide an economic and efficient system for the confinement and remediation of unsecured landfills.

SUMMARY OF THE INVENTION

The instant invention provides a method for improving degradation, stabilization, detoxification and volume reduction of refuse within an unsecured landfill. Moreover, the present invention overcomes the disadvantages of the prior art by controlling ground water surrounding the unsecured landfill, extracting the ground water surrounding the unsecured landfill and using the extracted ground water as a liquid medium to facilitate leachate recirculation and therefore treatment of the unsecured landfill. Leachate within the landfill is collected and monitored to determine the chemical constituents of the refuse. Additionally, degradation of the unsecured landfill can be accelerated by addition of microorganisms, nutrients, gases and other amendments into the leachate and then returning the leachate composition to be recirculated through the unsecured landfill refuse. It is also desirable to treat the refuse within the unsecured landfill by adding leachate mixed with nutrients or other amendments in situ. In this manner, the contaminated refuse rather than being removed and disposed of off site is treated through the continual degradation by the microorganisms present within the refuse and leachate mixture. The above process thereby removes problems associated with transport of contaminated refuse and further eliminates the need for building complex leachate treatment facilities for individual refuse and leachate contaminants.

Additionally, it has been shown that leachate recirculation could counteract the negative effect of winter temperatures. While a reduction in the rate of stabilization takes place in the winter, as a result of frozen landfill sections, leachate recirculation prevents such a freezing effect and thus acts to maximize the decomposition possible during any given period of time.

Lastly, in the anaerobic environment of the landfill, gas production results from degradation of the organic matter within the landfill. The resultant landfill gas, is comprised chiefly of methane and carbon dioxide, which if permitted to migrate into the air space surrounding the landfill could produce hazardous air conditions. The present invention provides a method of venting the resultant gases to avoid such potentially hazardous conditions.

Additional objects of this invention are to minimize the time required for treatment of the multitude of refuse contaminants within the unsecured landfill, by periodically monitoring individual contaminants and altering landfill condition to optimize degradation of each specific contaminant.

It is a further object to provide an improved method of addressing the treatment and disposal of the landfill leachate.

It is also an object of this invention to provide a less expensive means to eliminate contamination hazards to ground water supplies.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
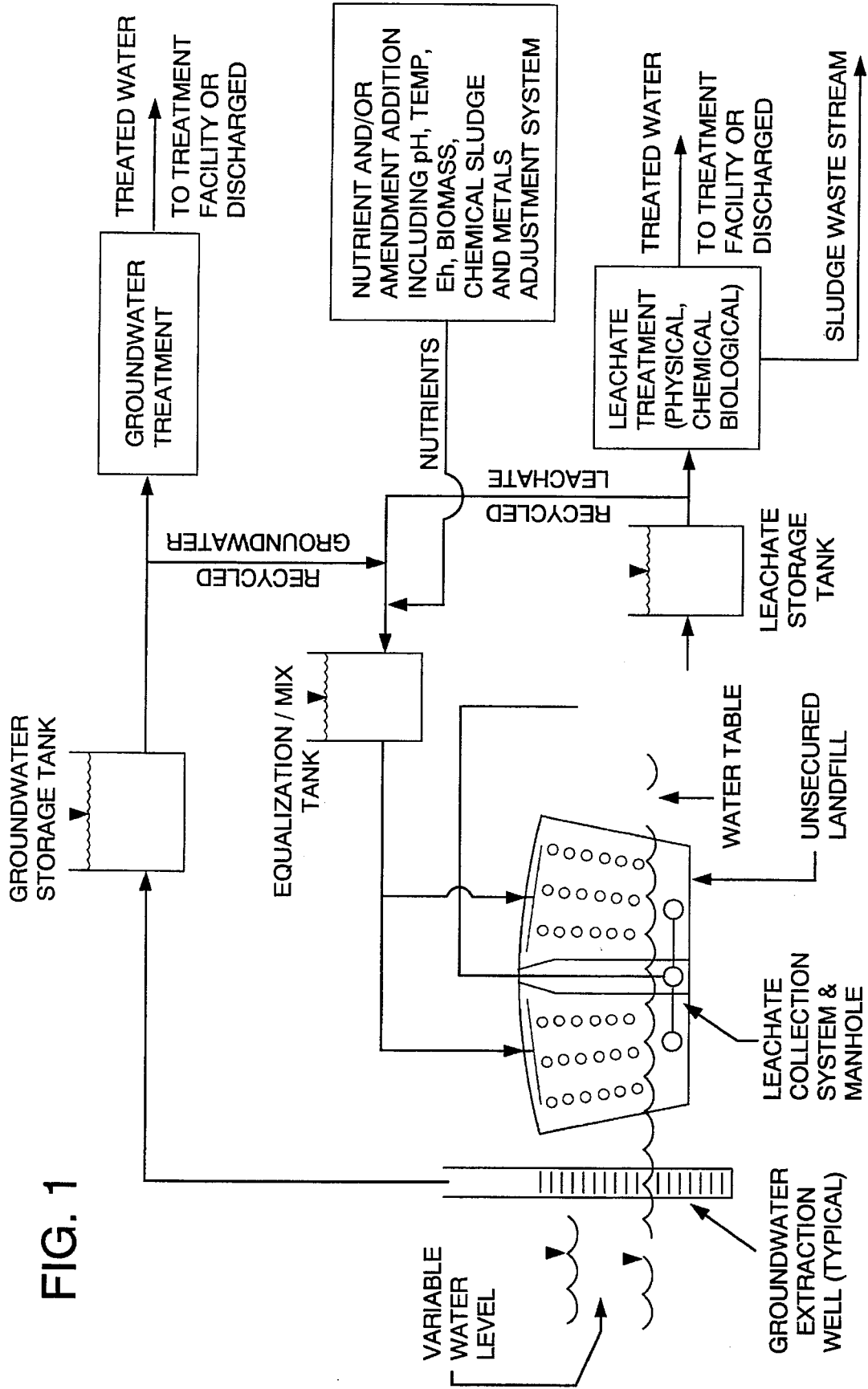
FIG. 1 is a site plan for a typical unsecured landfill showing the components of the leachate recirculation system installed at an unsecured landfill site.

The invention will be described with reference to FIG. 1. FIG. 1 depicts an unsecured landfill system and shows the components of the present leachate recirculation invention. As described in FIG. 1, the leachate recirculation system components include (1) a leachate collection system, (2) a leachate recirculation system, (3) a leachate treatment system, (4) a nutrient and/or amendment addition system, (5) a pH adjustment system, (6) a biomass addition system, (7) a temperature adjustment system, (8) an Eh adjustment system, (9) a perimeter groundwater collection system, (10) a metals removal system, (11) a groundwater storage tank, (12) a leachate storage tank, (13) a groundwater treatment system, (14) a system for dewatering biological and chemical sludge, (15) a groundwater collection system for hydraulic control, including piezometers within the unsecured landfill and surrounding the unsecured landfill, (16) mixing tank for the adjustment of pH, oxidation/reduction potential, and/or the addition of alkalinity, micronutrients, macronutrients, cometabolites, antibiotics, fumigants, sterilants, probiotics, conbiotics, electron acceptors, genetically engineered microorganisms, and cultured indigenous microorganisms to the recycled leachate.

Although the procedure is presented in a specific sequence, this sequence is not meant to be limiting in any way. On the contrary, several of these steps may occur simultaneously. Further, depending upon the particular site and its characteristics, not all steps may be required.

One important step to effectuating leachate recirculation for unsecured landfills requires an ability to control the groundwater surrounding a particular landfill site. It is thus important to conduct a geological and hydrogeological investigation within and surrounding the unsecured landfill site to assess the chemical composition of the waste material, soil and groundwater at the site. A thorough investigation includes identification of the critical or rate limiting chemicals, such information is preferably used to design a leachate recirculation system which can effectively remediate the media and chemicals of concern.

Data from the hydrogeological investigation can be used to design groundwater and leachate collection systems capable of capturing leachate and impacted groundwater thus providing hydraulic control at the site.

The hydrogeological investigation also includes a pump test in a well which fully penetrates the aquifer outside of the unsecured landfill area. The well should be screened across the entire saturated zone. The pump test should be conducted in accordance with EPA guidelines.

To further insure control of the surrounding groundwater, piezometers or monitoring wells are installed within the unsecured landfill area and also on the perimeter of the unsecured landfill. Once these monitoring wells are in place, regular measurements of the static water level in the waste area and surrounding area can be taken. Such monitoring and adjustment to the leachate recirculation system can prevent flooding in the landfill area. In addition, optimal operation of the groundwater collection and control system maximizes capture of the contaminated area or plume and prevents migration of leachate from the landfill.

Groundwater located in a downgradient position from the uncontrolled landfill can be collected using a series of vertical extraction wells, horizontal collection trenches, sheet piling in conjunction with extraction wells or horizontal collection trenches, or slurry wall in conjunction with extraction wells or horizontal collection trenches.

Preferably, vertical recovery wells are installed in a downgradient position from the unsecured landfill. The vertical recovery wells should be spaced in order to provide a minimum of 1-inch influence at the boundary of adjacent cones-of-influence.

The collected groundwater will as necessary based on a site specific water balance be (1) treated and disposed offsite, (2) combined with collected leachate and recirculated through the refuse, or (3) recirculated through the refuse.

A second step involves installing a leachate collection system. Preferably an intricate network of pipes can be positioned within the landfill to collect the percolating leachate.

The leachate collection system piping can be installed using typical open-cut construction techniques, hydraulic trench-box techniques, or sophisticated construction equipment specifically designed for installing shallow leachate collection piping systems. The sophisticated techniques eliminate the need for site workers to enter the trench and the trench is immediately backfilled as the perforated piping is installed.

The area surrounding the perforated leachate collection piping is backfilled partially with gravel and/or stone to provide a porous conduit for the transmission of leachate into the leachate collection system. The leachate collection system is installed at an elevation lower than the organic material present in the unsecured landfill.

The designer must devise a method to intercept and collect any leachate which migrates vertically from the unsecured landfill site. Accordingly, a water balance equation should be generated for each unsecured landfill site to calculate the expected quantity of leachate and groundwater. Since there is no liner beneath the unsecured site, the operator must also include a term in the water balance equation for the vertical migration of leachate.

Figure 2:
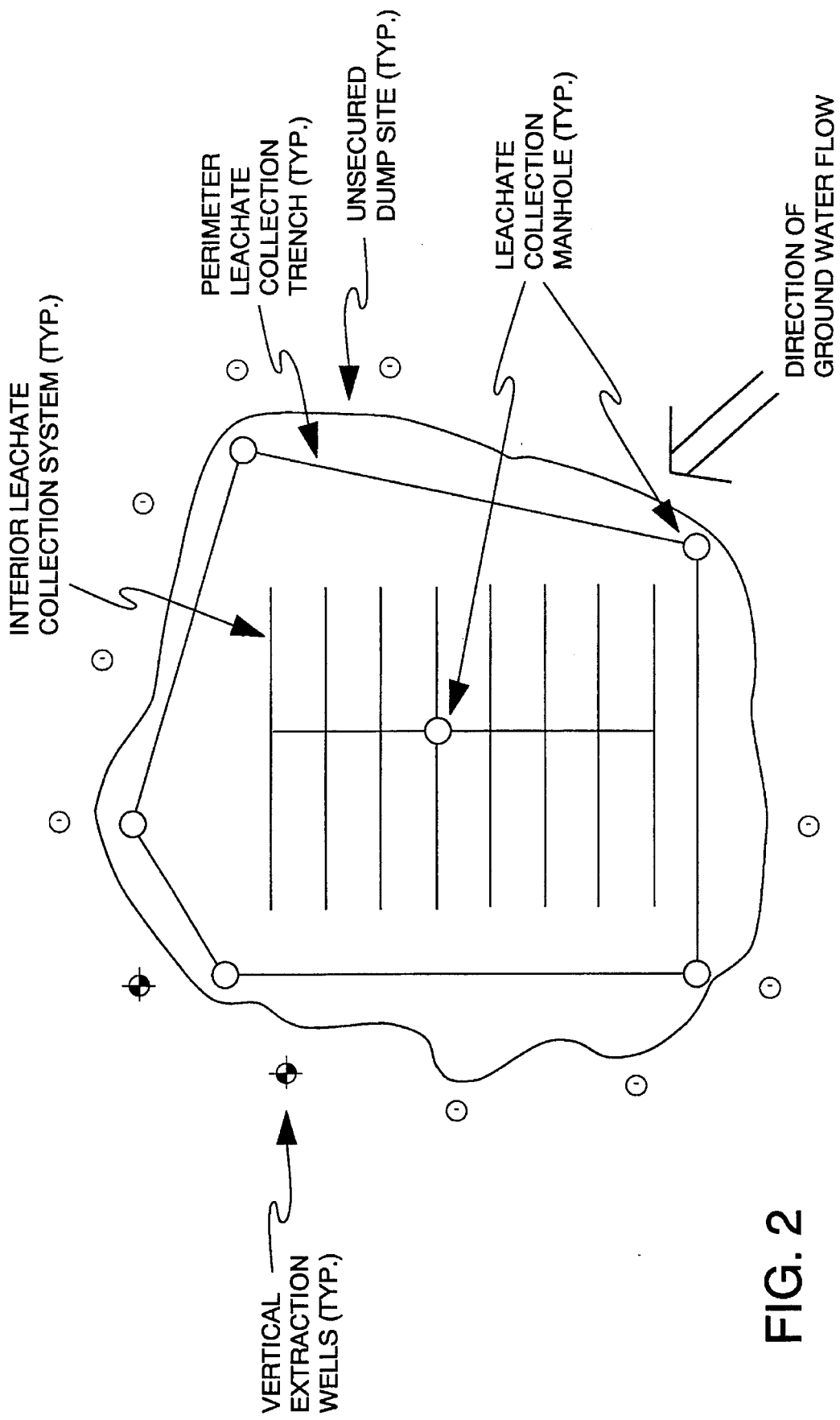
FIG. 2 is a site plan for a typical unsecured landfill site showing the location of the unsecured landfill and the groundwater flow direction in the vicinity of the unsecured landfill site.

As embodied and described in FIG. 2, the apparatus preferably includes a pumping and leachate handling system to transport collected leachate to the leachate storage tank. Leachate pumped to the leachate storage tank may then be mixed with groundwater and supplemented with nutrients or other additives. To insure optimum recirculation of the leachate a distribution system should be installed.

In this vein, the use of infiltrators acts to distribute the recycled leachate across the uncontrolled dump site. The infiltrators act as a tile field to spread leachate under the dump site cap. The distribution of leachate to each infiltrator lateral is controlled by a valve system and through intermittent operation.

Reinjection piping "infiltrators" are positioned across the waste pile so that the leachate will contact the waste materials and stimulate the and metabolism of microorganisms to consume the organic and inorganic materials within the unsecured landfill. The infiltrators are also positioned upgradient from the leachate collection trenches such that the recycled leachate is within the capture zone of the leachate collection trench. The infiltrators should be installed beneath the frost line.

The infiltrator trenches are sized and positioned based on the size, depth, and soil conditions present in the unsecured landfill, in addition to the hydraulic characteristics of the waste material itself. Those skilled in the area of geology and hydrogeology can determine the infiltrator trench spacing necessary to maximize the intimate contact of leachate and waste materials. In general, shallow unsecured landfills will require more closely spaced infiltrator trenches compared with deeper landfills. Porous waste materials will also require more closely spaced infiltrator trenches compared with less permeable waste materials. The leachate recirculation rate must also be reduced when treating materials having low permeability to prevent leachate ponding and leachate outbreaks along the downgradient edge of the unsecured landfill.

To control the groundwater and maintain optimum moisture control within the landfill, monitoring parameters within the unsecured landfill should include: 1) percent moisture; 2) groundwater pumping rate; 3) leachate pumping rate; 4) leachate recirculation rate;and 5) gallons/acre per day.

An additional step involves accelerating degradation of the refuse within a landfill by monitoring and altering the levels of microorganisms, nutrients and other amendments within the landfill. This involves analysis of the chemical constituency of collected leachate and/or analysis of collected groundwater.

The operator shall test and monitor the operating parameters of concern. In addition, the operator shall monitor for site specific chemicals of concern. The monitoring locations shall include collected leachate, recycled leachate, collected groundwater, and physio-chemical treated groundwater.

The leachate level within the material at the unsecured dump site shall be monitored via piezometers installed within the waste pile and the area surrounding the unsecured landfill site. The site operator shall adjust the addition of recycled leachate in-order-to optimize the distribution and moisture content of material within the landfill.

Monitoring parameters in the collected and recycled leachate and groundwater may include: 1) Volatile Organic Compounds (Method 8010 and 8020); 2) Chemical Oxygen Demand; 3) Biological Oxygen Demand; 4) Total Organic Carbon; 5) Oxidation/Reduction Potential; 6) pH; 7) Dissolved Oxygen; 8) Ammonia Nitrogen; 9) Nitrate Nitrogen; 10) Total Kjeldahl Nitrogen; 11) Soluble Phosphorous; 12) Sulfate; 13) Carbon dioxide; 14) Total Alkalinity; 15) Carbonate Alkalinity; 16) Bicarbonate Alkalinity; 17) specific conductance; 18) total dissolved solids; 19) temperature; 20) volatile organic acids; 21) acetic acid; 22) propionic acid; 23) isobutyric acid; 24) butyric acid; 25) isovaleric acid; 26) valeric acid; 27) sodium; 28) manganese; 29) magnesium; 30) sulfur; 31) sulfide; 32) iron; 33) chloride; 34) potassium; 35) calcium; 36) magnesium; 37) chloride; 38) cobalt; 39) copper; 40) zinc; 41) nickel; 42) boron; 43) molybdenum; 44) selenium.

Additionally, it is beneficial to monitor the leachate dissolved oxygen concentration and oxidation reduction potential, as this information may be used to evaluate system health and biodegradation potential of the refuse within the landfill.

More specifically, certain optimum conditions are desirable for specific operating parameters within the landfill.

In order to achieve the optimum moisture content for biodegradation, one can supplement the quantity of leachate for recirculation by adding groundwater extracted from a downgradient position. Recirculated groundwater may be purged with an inert gas in order to strip dissolved oxygen.

The optimum moisture content within the unsecured landfill should typically be within the range of 25% to 100% of field capacity.

The liquid addition to an unsecured landfill should typically be within the range of 7,000 to 175,000 gallons per acre per week.

Adjust the pH of the recirculated leachate in the range of 5.5 to 8.5. To raise the pH add $NaOH$, $NaHCO_3$, $Ca(OH)_2$, or hydrated $CaO$. To lower the pH add $H_3PO_4$, $H_2SO_4$, or $HCl$.

The total volatile acids to alkalinity ratio in the leachate collected from within the unsecured landfill, and the fluid returned to the waste pile should not exceed 1:2.

Leachate having ammonia concentrations which exceed 50–500 mg/l at a pH of 7 may be treated to remove a portion or all the ammonia. Alternately, the leachate should be diluted with groundwater to reduce the ammonia toxicity to methanogens. If ammonia concentrations in anaerobically treated leachate persist, the excess ammonia can be removed by air stripping following pH adjustment to 11 to 12.

The leachate shall be diluted using groundwater in order to reduce the effects of toxic compounds present in the leachate. The dilution of leachate may also be used to beneficially alter the recycled leachate pH and ORP to optimize degradation of organic materials at the unsecured landfill site.

Mixing of nutrients (i.e. nitrogen, phosphorous, micronutrients) and other amendments with leachate and/or groundwater shall be conducted in a pipeline using static mixers, in a separate tank, or other enclosed vessel under controlled conditions. The additives shall be added using an appropriate metering pump to deliver the prescribed quantity.

One skilled in the art of microbiology can determine the optimum growth conditions for the microorganisms responsible for acidogenesis and methanogenesis processes responsible for the detoxification of materials found in the landfill refuse. In addition, the individual skilled in the art of microbiology can also determine the optimum conditions necessary within the refuse to optimize the growth of microorganisms. Since it is not possible in many situations to control all factors required to fully optimize, the operator must identify and manipulate those factors which can most influence and accelerate process performance.

The following additives may be added to the recycled leachate to alter the chemical constituents within the refuse and bring the chemical constituents to an optimal level: 1) pH adjustment; 2) sodium carbonate; 3) sodium bicarbonate; 4) sodium hydroxide; 5) calcium oxide; 6) calcium hydroxide; 7) sulfuric acid; 8) phosphoric acid; 9) sodium hydroxide; 10) ferric hydroxide; 11) ferric chloride; 12) ferric sulfate; 13) ferrous surface; 14) organic polymer chemicals; 15) sodium phosphate; 16) urea nitrogen; 17) ammonia nitrogen; 18) sodium nitrate; 19) sugar, carbohydrate, or protein substrate/cometabolite, molasses, methanol; 20) oxygen; 21) hydrogen peroxide; 22) air; 23) genetically-engineered organisms; 24) indigenous organisms cultured in the onsite biological treatment system; 25) micronutrient elements and other amendments; 26) groundwater; 27) surface water; 28) rainwater; and 29) melted snow.

The microorganisms used for the biodegradation of organic and inorganic materials found in the refuse can be either naturally occurring in the refuse at the site or others specifically chosen to consume the chemicals present in the refuse including genetically engineered microorganisms. It is also possible to use a combination of naturally occurring microorganisms and genetically engineered or externally cultured microorganisms.

A by-product of the microbial degradation of organic and inorganic materials is the accelerated production of methane and other gases by microbial metabolism. This technique which increases the moisture content of the waste stimulates the production of volatile organic acids and subsequently the production of methane under anaerobic conditions. The accumulation of methane and other gases beneath more impermeable sections of the cap can increase the potential for explosive and combustible conditions. Therefore, gas vents will be installed at regular intervals (i.e. one vent per acre), to vent the accumulated gas and reduce the potential for explosions or fire. Each gas vent may include an activated carbon canister to treat the gas for the removal of odorous compounds such as hydrogen sulfide and mercaptans.

Monitoring parameters in the unsecured landfill include analysis of the landfill gas composition: 1) methane; 2) carbon dioxide; 3) carbon monoxide; 4) oxygen; 5) nitrogen; 6) hydrogen; 7) relative humidity; 8) temperature.

A final step requires providing a treatment facility for the leachate and groundwater. Excess leachate and groundwater may be treated using a variety of treatment technologies prior to discharge into surface water bodies or transport to an off-site industrial waste treatment facility. The leachate may be treated using physical, chemical, or biological treatment processes.

Physical treatment processes may include ultrafiltration, ion exchange, carbon adsorption, critical fluid extraction, incineration, and air stripping.

Chemical treatment processes may include chemical precipitation, and chemical addition.

Biological treatment processes include anaerobic, anoxic, and aerobic treatment processes. Examples of anaerobic processes include upflow anaerobic sludge bed, sand fluidized bed reactor, granular activated carbon (GAC) fluidized bed reactor, anaerobic packed column. Examples of aerobic processes include activated sludge, powdered activated carbon treatment (PACT), and sequencing batch reactor.

Select the method of leachate treatment based on the concentration of metals and chemicals present in leachate and recycled groundwater plus leachate. Concentrations of chemicals which have been demonstrated by other investigators in literature to exhibit toxicity should be treated to reduce those chemical concentrations to acceptable levels.

Monitoring parameters in the leachate influent and biological treated effluent should thus include: 1) Volatile Organic Compounds; 2) total suspended solids; 3) volatile suspended solids; 4) Chemical Oxygen Demand; 5) Biological Oxygen Demand; 6) Total Organic Carbon; 7) Oxidation/Reduction Potential; 8) pH; 9) Dissolved Oxygen; 10) Ammonia Nitrogen; 11) Nitrate Nitrogen; 12) Total Kjeldahl Nitrogen; 13) Soluble Phosphorous; 14) Sulfate; 15) Carbon dioxide; 16) Total Alkalinity; 17) Carbonate Alkalinity; 18) Bicarbonate Alkalinity; 19) specific conductance; 20) total dissolved solids; 21) temperature; 22) volatile organic acids; 23) acetic acid; 24) propionic acid; 25) isobutyric acid; 26) butyric acid; 27) isovaleric acid; 28) valeric acid; 29) sodium; 30) manganese; 31) magnesium; 32) sulfur; 33) sulfide; 34) iron; 35) chloride; 36) potassium; 37) calcium; 38) magnesium; 39) chloride; 40) cobalt; 41) copper; 42) zinc; 43) nickel; 44) boron; 45) molybdenum; 46) selenium; and 47) other chemicals of concern.

The invention is further illustrated by the following non-limiting examples wherein all parts are parts by weight and all degrees are in Centigrade unless otherwise indicated.

It will be apparent to those skilled in the art that various modifications can be made to the technique discussed in this invention. Therefore, it is intended that the present invention cover the modifications and variations which do not depart from the goal and spirit of this invention.

We claim:

1. A method for improving degradation, stabilization, detoxification and volume reduction of refuse within an unsecured landfill comprising:

installing at least one well proximate to the landfill in the direction of the flow of groundwater so as to provide control over the groundwater proximate the landfill;

extracting the groundwater from the well to substantially prevent migration of contaminated groundwater or leachate from the landfill and provide a source of moisture for use within the landfill;

collecting leachate from the landfill;

monitoring the leachate so as to determine the chemical constituents of the refuse within the landfill;

injecting additives into the leachate so as to alter the chemical constituents of the refuse within the landfill and increase the rate of degradation; and recirculating the leachate within the landfill.

2. The method of claim 1 further comprising the steps of monitoring the pH level of the leachate; and injecting a pH altering additive into the leachate to maintain the pH of the leachate in the range of 5.5 to 8.5 wherein the pH altering additive is selected from the group consisting of cement, lime, phosphates, carbonates and weak acids and their salts.

3. The method of claim 1 further comprising the steps of monitoring the balance of micronutrients and additives within the leachate; and injecting a micronutrient altering additive into the leachate to maintain micronutrient balance within the landfill, wherein a micronutrient altering additive is selected from the group consisting of Na, Mg, S, Cl, K, Ca, Mn, Fe, Co, Ni, Cu and Zn.

4. The method of claim 1 further comprising the steps of monitoring the balance of macronutrients within the leachate; and injecting a macronutrient altering additive into the recirculating leachate to maintain balance within the landfill, wherein the macronutrient altering additive is selected from the group consisting of P and N.

5. The method of claim 1 further comprising the steps of monitoring the level of sugar within the leachate; and injecting a sugar altering additive into the leachate to maintain a desired level of sugar for purposes of degradation.

6. The method of claim 1 further comprising the steps of monitoring the level of carbohydrates within the leachate; and injecting a carbohydrate altering additive into the leachate to maintain a desired level of carbohydrates for purposes of degradation.

7. The method of claim 1 further comprising the steps of monitoring the level of proteins within the leachate; and injecting a protein altering additive into the leachate to maintain an optimum desired level of protein for purposes of degradation.

8. The method of claim 1 further comprising the steps of monitoring the level of temperature within the landfill; and providing means for adjusting the temperature of the landfill to maintain a desired temperature for purposes of degradation.

9. The method of claim 1 further comprising the steps of monitoring the alkalinity level of the leachate; and injecting an alkaline altering additive into the leachate to balance the alkaline level of the landfill to further improve degradation of the landfill, wherein the alkaline altering additive is selected from the group consisting of $CO_2$, $CO_3$, $HCO_3$, CaO.

10. The method of claim 1 further comprising the steps of monitoring the moisture content of the refuse within the landfill so as to maintain a desired flow balance within the landfill and improve degradation of the refuse within the landfill; and altering the balance of moisture in the leachate so as to maintain the moisture content of the refuse within the landfill in the range between 25% and 100% so as to improve degradation of the refuse within the landfill.

11. The method of claim 1 further comprising the steps of distributing a source of water onto the landfill so as to cause the groundwater to contact the refuse within the landfill and percolate through the landfill, said source of water comprising groundwater, surface water or melted snow.

12. The method of claim 1 further comprising the steps of monitoring the microbial population within the landfill refuse and leachate; and injecting additives able to vary the microbial population of the leachate so as to improve degradation within the landfill.

13. The method of claim 1 further comprising the steps of monitoring the level of volatile organic acids within the landfill; and adjusting operating parameters so as to improve degradation of the refuse therein.

14. The method of claim 1 further comprising the step of monitoring the gas composition within the landfill, wherein the gas to be monitored is selected from the group consisting of methane, carbon dioxide, carbon monoxide, nitrogen, hydrogen and oxygen.

15. The method of claim 1 further comprising the steps of monitoring the biochemical oxygen concentration within the leachate; and providing means for altering the biochemical oxygen concentration within the leachate to improve degradation of the refuse within the landfill.

16. The method of claim 1 further comprising the step of installing a leachate collection drainage system to collect leachate from the landfill.

17. The method of claim 16 wherein the leachate drainage system comprises a set of pipes extending both horizontally and vertically from the bottom of the landfill so that the leachate can be readily collected.

18. The method of claim 1 further comprising the step of distributing a liquid medium into the landfill by use of an infiltrator so as to distribute the liquid medium across the surface of the landfill, wherein a liquid medium is selected from the group consisting of groundwater, surface water, melted snow or leachate.

19. The method of claim 1 further comprising the step of distributing a liquid medium into the landfill by use of a slotted pipe so as to distribute the liquid medium across the surface of the landfill, wherein a liquid medium is selected from the group consisting of groundwater, surface water, melted snow or leachate.

20. The method of claim 1 further comprising the step of installing a liquid storage tank to store the liquid medium.

21. The method of claim 1 further comprising the step of treating the liquid medium.

22. The method of claim 22 further comprising the step of transporting the treated liquid medium to a treatment facility.

23. The method of claim 22 further comprising the step of disposing the resultant refuse caused by the liquid medium treatment.

24. The method of claim 1 wherein a well screen is installed under a water table.

25. A leachate collection apparatus for improving the degradation, stabilization, detoxification and volume reduction of refuse within an unsecured landfill comprising:

at least one well disposed along the perimeter of the landfill and in the direction of the flow of groundwater so as to extract the groundwater and provide hydraulic control over the groundwater proximate the landfill;

distribution means for passing a liquid medium through the refuse within the landfill, the distribution means connected to at least one of said wells;

at least one drainage pipe positioned within the landfill so as to collect leachate, the drainage pipe is also connected to the distribution means;

monitoring means for measuring the chemical constituents present in the refuse within the landfill;

means for injection of additives into the landfill to alter the chemical constituents present in the refuse to degrade the refuse; and means for recycling a portion of the collected leachate through the refuse within the landfill through the distribution means.

26. A method for improving degradation, stabilization, detoxification and volume reduction of refuse within an unsecured landfill comprising:

installing at least one well proximate to the landfill in the direction of the flow of groundwater so as to provide control over the groundwater proximate the landfill;

extracting the groundwater from the well to substantially prevent flooding of the landfill and provide a source of moisture for use within the landfill;

storing a portion of the groundwater in a groundwater storage tank to provide a source of moisture for use within the landfill;

monitoring the groundwater to determine the level of contamination present within the groundwater to distinguish highly contaminated from non-highly contaminated groundwater;

separating the highly contaminated groundwater from the non-highly contaminated groundwater;

distributing the non-highly contaminated groundwater across the surface of the landfill to maintain the moisture content within the landfill at a desired level;

collecting leachate from the landfill using a plurality of drainage pipes;

storing a portion of the leachate in a leachate storage tank;

monitoring the leachate so as to determine the chemical constituents of the refuse within the landfill;

injecting additives into the leachate so as to alter the chemical constituents of the refuse within the landfill and increase the rate of degradation;

recirculating the leachate within the landfill;

treating the excess leachate using physical, chemical or biological processes so as to alter the composition of the leachate to a level acceptable for discharge into groundwater, surface water bodies or transport to an off-site industrial waste treatment facility; and treating the excess groundwater using physical, chemical or biological processes so as to alter the composition of the groundwater to a level acceptable for discharge into groundwater, surface water bodies or transport to an off-site waste treatment facility.

* * * * *

UNITED STATES PATENT AND TRADEMARK OFFICE
CERTIFICATE OF CORRECTION

PATENT NO. : 5,605,417
DATED : February 25, 1997
INVENTOR(S) : Christopher J. Englert et al.

It is certified that error appears in the above-indentified patent and that said Letters Patent is hereby corrected as shown below:

Column 11, line 29, delete "22" and insert therefore ---21---.

Signed and Sealed this

Eleventh Day of November, 1997

Attest:

BRUCE LEHMAN

Attesting Officer          Commissioner of Patents and Trademarks